United States Patent [19]

deNeufville et al.

[11] Patent Number: 4,621,032

[45] Date of Patent: Nov. 4, 1986

[54] METHOD OF FORMING A DATA STORAGE MEDIUM AND DATA STORAGE DEVICE BY CONGRUENT SUBLIMATION

[75] Inventors: John P. deNeufville, Mendham, N.J.; David A. Strand, West Bloomfield, Mich.

[73] Assignee: Energy Conversion Devices, Inc., Troy, Mich.

[21] Appl. No.: 760,226

[22] Filed: Jul. 29, 1985

[51] Int. Cl.$^4$ .................. B32B 9/00; B32B 19/00; C23C 16/00

[52] U.S. Cl. .................. 428/688; 427/248.1; 427/255.2; 427/255.3; 427/255.5; 428/65; 428/689; 428/698; 428/702; 428/704; 428/913; 428/938

[58] Field of Search ............... 427/248.1, 255.2, 255.3, 427/255.5, 162; 428/65, 688, 689, 698, 702, 704, 938, 913

[56] References Cited

U.S. PATENT DOCUMENTS

| | | | |
|---|---|---|---|
| 3,218,203 | 11/1965 | Ruehrwein | 427/255.2 |
| 3,530,441 | 9/1970 | Ovshinsky | 346/74 |
| 3,664,866 | 5/1972 | Manasevit | 427/255.2 |
| 3,870,558 | 3/1975 | Shimizu et al. | 427/255.3 |
| 3,971,874 | 7/1976 | Ohta et al. | 427/248.1 |
| 4,066,481 | 1/1978 | Manasevit et al. | 427/255.2 |
| 4,069,356 | 1/1978 | Fischer | 427/248.1 |
| 4,091,171 | 5/1978 | Ohta et al. | 427/248.1 |
| 4,207,119 | 6/1980 | Tyan | 427/255.3 |
| 4,447,469 | 5/1984 | Peters | 427/255.2 |

FOREIGN PATENT DOCUMENTS

| | | | |
|---|---|---|---|
| 54-6875 | 1/1979 | Japan | 427/255.2 |
| 55-163638 | 12/1980 | Japan | 427/248.1 |

OTHER PUBLICATIONS

Holloway et al, "Isothermal Effusion Sources for Vacuum Deposition of Solid Solutions", J. of Vacuum Sci. & Tech., vol. 7, No. 6, pp. 586-588, 1970.
Sanitarov et al, "Epitaxial Layers of Solid Solutions CdSe$_x$Te$_{1-x}$, Inorganic Material, vol. 13, No. 2, pp. 210-212, Jul. 1977.
Dashevskii et al, "Preparation & Certain Properties of Films of Solid Solutions of the System Bi$_2$Te$_{3-x}$Se$_x$", Inorganic Material, vol. 13, No. 6, pp. 786-788, Nov. 1977.
Freik, et al, "Preparation of Subgroup IV Chalcogenides in a Double Quasiclosed Volume", pp. 527-528, Aug. 1978.
Baltrunas et al, "Investigation of Films Belonging to the System Sn$_{1-x}$Pb$_x$Te and Produced Under Quasi--Equilibrium Conditions", Physical Collect., vol. 18, No. 5, pp. 50-55, 1978.
Feltz et al, "Preparation of Amorphous Layers of Ge$_4$Se$_5$Te and Their Electrical Properties", Thin Solid Films, vol. 70, (1980) pp. 175-180, 1980.
Takenaga et al, "New Optical Medium Using Tellurium Suboxide Thin Film", Proceedings, SPIE Conference on Optical Data Storage, pp. 173-177, 1983.
Feinleib et al, "Rapid Reversible Light-Induced Crystallization of Amorphous Semiconductors", Applied Physics Letters, vol. 18, No. 6, Mar. 15, 1971.
Chen et al, "Reversibility and Stability of Tellurium Alloys for Optical Data Storage Applications", Appl. Phys. Lett., vol. 46, No. 8, Apr. 15, 1985.

*Primary Examiner*—Sadie L. Childs
*Attorney, Agent, or Firm*—Richard M. Goldman; Judith M. Riley

[57] ABSTRACT

Disclosed is an optical data storage device and a method of making the device. The device has a thin film of a multi-component, phase changeable, chalcogenide material. The thin film is prepared by vacuum deposition of a substantially non-convecting, multi-component, chalcogenide containing first source. The multi-component source is converted to a non-condensed state, and the non-condensed material is deposited onto the substrate to form a deposit having substantial source/deposit compositional equivalence and the substantial absence of concentration gradients.

25 Claims, 2 Drawing Figures

METHOD OF FORMING A DATA STORAGE MEDIUM AND DATA STORAGE DEVICE BY CONGRUENT SUBLIMATION

ART TO WHICH INVENTION RELATES

The invention disclosed herein relates to optical data storage devices where data is stored in a material, e.g. a state changeable material, that is switchable e.g., from one detectable state to another, or between two detectable states, by the application of projected beam energy thereto.

BACKGROUND OF THE INVENTION

Non ablative, state changeable, optical data storage systems record information in a state changeable material that is switchable between at least two detectable states by the application of energy thereto, for example, the application of projected beam energy such as optical energy, particle beam energy or the like.

The state changeable optical data storage material is present in an optical data storage device having a structure such that the optical data storage material is supported by a substrate and encapsulated in encapsulants. The encapsulants may include anti-ablation materials and layers, thermal insulating materials and layers, anti-reflection layers between the projected beam source and the data storage medium, reflective layers between the optical data storage medium and the substrate, and the like. Various layers may perform more than one of these functions. For example, the anti-reflection layers may also be thermal insulating layers. The thicknesses of the layers, including the layer of state changeable data storage material, are optimized whereby to minimize the energy necessary for state change while retaining the high contrast ratio, high signal to noise ratio, and high stability of the state changeable data storage material.

The state changeable material is a material capable of being switched from one detectable state to another detectable state by the application of projected beam energy thereto. State changeable materials are such that the detectable states may differ in their morphology, surface topography, relative degree of order, relative degree of disorder, electrical properties, and/or optical properties, e.g., reflectivity and/or refractive index, and that the state of the material be detectable, e.g., by the electrical conductivity, electrical resistivity, optical transmissivity, optical absorption, optical reflectivity and any combination thereof.

Tellurium based materials have been utilized as phase changeable memory materials. This effect is described, for example, in J. Feinleib, J. deNeufville, S. C. Moss, and S. R. Ovshinsky, "Rapid Reversible Light-Induced Crystallination of Amorphous Semiconductors," *Appl. Phys. Lett.*, Vol. 18(6), pages 254–257 (Mar. 15, 1971), and in U.S. Pat. No. 3,530,441 to S. R. Ovshinsky for *Method and Apparatus For Storing And Retrieving Of Information*. A recent description of tellurium-germanium-tin systems, without oxygen, is in M. Chen, K. A. Rubin, V. Marrello, U. G. Gerber, and V. B. Jipson, "Reversibility And Stability of Tellurium Alloys For Optical Data Storage," *Appl. Phys. Lett.*, Vol. 46(8), pages 734–736 (Apr. 15, 1985). A recent description of tellurium-germanium-tin systems with oxygen is in M. Takanaga, N. Yamada, S. Ohara, K. Nishiuchi, M. Nagashima, T. Kashibara, S. Nakamura, and T. Yamashita, "New Optical Erasable Medium Using Tellurium Suboxide Thin Film," Proceedings, SPIE Conference on Optical Data Storage, Arlington, Va., 1983, pages 173–177.

Prior art deposition techniques include evaporative deposition. However, disordered memory materials deposited by evaporative deposition have been found to suffer from concentration gradients with respect to deposition depth. This is not altogether remedied by "initializing." That is, while the memory material must be initialized as described, for example, in the commonly assigned copending U.S. Application Ser. No. 667,294, filed Nov. 1, 1984, of Rosa Young and Napoleon Formigoni for *Method Of Forming An Optical Data Storage Device*, the vertical gradients may not be eliminated thereby. As described therein, the memory material must be conditioned, formed, initialized, or otherwise prepared to receive data if the data is going to be recorded in a disordered ("binary") state. Initialization, i.e. formation, requires the conversion of the phase changeable data storage material from the as deposited disordered state to a stable system switchable between a state corresponding to binary 1 and state corresponding to binary "0," with history invariant cycling properties.

Present systems are multiphase systems where the ordering phenomena includes a plurality of solid state reactions and/or interactions to convert a system of predominantly disordered materials to a system of ordered and disordered materials, and where the vitrification phenomena includes solid-solid, solid-liquid, and liquid-liquid reactions and/or interactions, including reactions and/or interactions at phase interfaces, whereby to convert a system of disordered and ordered components to a system of predominantly disordered components. The above phase separations occur over relatively small distances with intimate interlocking of the phases and gross structural discrimination.

Exemplary of this reacting system is the reaction of the prior art disordered germanium-tellurium-oxygen systems under "crystallizing" conditions to form germanium oxides, including suboxides and non-stochiometric oxides, tellurium, and different germanium-tellurium compounds, where the tellurium is crystalline.

SUMMARY OF THE INVENTION

The problem of gradients in films formed by evaporative deposition is obviated by the method of the present invention.

As herein contemplated, there is provided a method of depositing a multicomponent material, e.g., a projected energy beam switchable data storage material, a switching material, a threshold switching material, or a memory material. This is accomplished by providing within a vacuum deposition means (1) a substantially non-convecting, multicomponent, chalcogenide, first source, and (2) a chalcogen second source. The first source is preferably a substantially single phase source. It may be a solid source or a liquid source. Optionally, an oxygen containing third source may be present. According to the method of the invention, the substantially non-convecting, multicomponent, single phase, chalcogenide material is converted to a non-condensed state, e.g., a gas, with substantial source/non-condensed state equivalence. The material is then deposited on the substrate with substantial non-condensed state/deposit equivalence.

Generally, the chalcogen will be tellurium, and the first source will contain tellurium, germanium, and tin, e.g., as a congruently sublimating composition of tin telluride and germanium telluride, i.e., having substantial source/non-condensed state compositional equivalence.

The resulting memory material is reversibly switchable from one detectable state to another. That is, the memory material is (a) reversibly switchable between detectable states, and (b) settable from a first state to a second state and reversible therefrom. Switching is, for example, by optical energy, particle beam energy, or the like. Exemplary materials for forming the switchable phase are chalcogens containing cross linking agent materials which may contain other materials. Exemplary memory materials include tellurium, for example, where the tellurium is present with a cross linking agent or agents. Thus, the memory material may be reversibly switchable between (1) a first system of an amorphous, first tellurium and cross linking agent composition or compositions and, (2) a second system of (a) a crystalline tellurium, and (b) an amorphous, second tellurium and cross linking agent composition or compositions. The crystalline tellurium and the disordered second tellurium and cross linking agent compositions effectively phase separate upon crystallization of the amorphous, first tellurium-cross linking agent composition. The difference between the optical properties of the two states is sufficient to provide discrimination therebetween.

Suitable cross linking agents include the elements of Groups IIIB, IVB, VB, and VIB of the Periodic Table. These include Al, In, and Ga from Group IIIB, Si, Ge, and Sn from Group IVB, N, P, As, Sb, and Bi from Group VB, and S and Se from Group VIB, as well as combinations thereof. Exemplary cross linking agents include silicon, germanium, tin, arsenic, antimony, and mixtures thereof, especially silicon and/or germanium, either alone or with one or more of tin, arsenic, or antimony. Exemplary chalcogenide compositions include the chalcogen, e.g., tellurium, and a cross linking agent, e.g., silicon and/or germanium, or silicon and/or germanium with another cross linking agent in an amount sufficient to form a stable disordered chalcogenide, and an oxide. Generally the atomic ratio of the cross linking agents to total tellurium and cross linking agent(s) is from about 1 percent to about 20 percent. In oxide systems, the atomic ratio of oxygen to total tellurium and cross linking agent(s) is from about 2 percent to about 30 percent.

THE FIGURES

The invention may be particularly understood by reference to the Figures appended hereto.

DETAILED DESCRIPTION OF THE INVENTION

According to the invention described herein, there is provided a projected beam data storage device having a memory material switchable between detectable states by the application of projected beam energy thereto.

According to the invention herein contemplated, there is provided a method of forming a layer of memory material for the projected beam data storage device. The method comprises depositing a multi-component, phase changeable, chalcogenide material on a substrate to form a deposit thereof, for example, a substantially uniform deposit. According to the invention herein contemplated, the reagents are provided in a vacuum deposition means. The reagents include a substantially non-convecting, multi-component, chalcogenide first source. The first source may be a solid or a liquid, e.g., a substantially non-convecting liquid. The first source is a substantially single phase material. Other reagents that may be present may be a chalcogen source or reagent, a cross linking agent source or reagent, and an oxygen containing source, among others.

Figure 1:
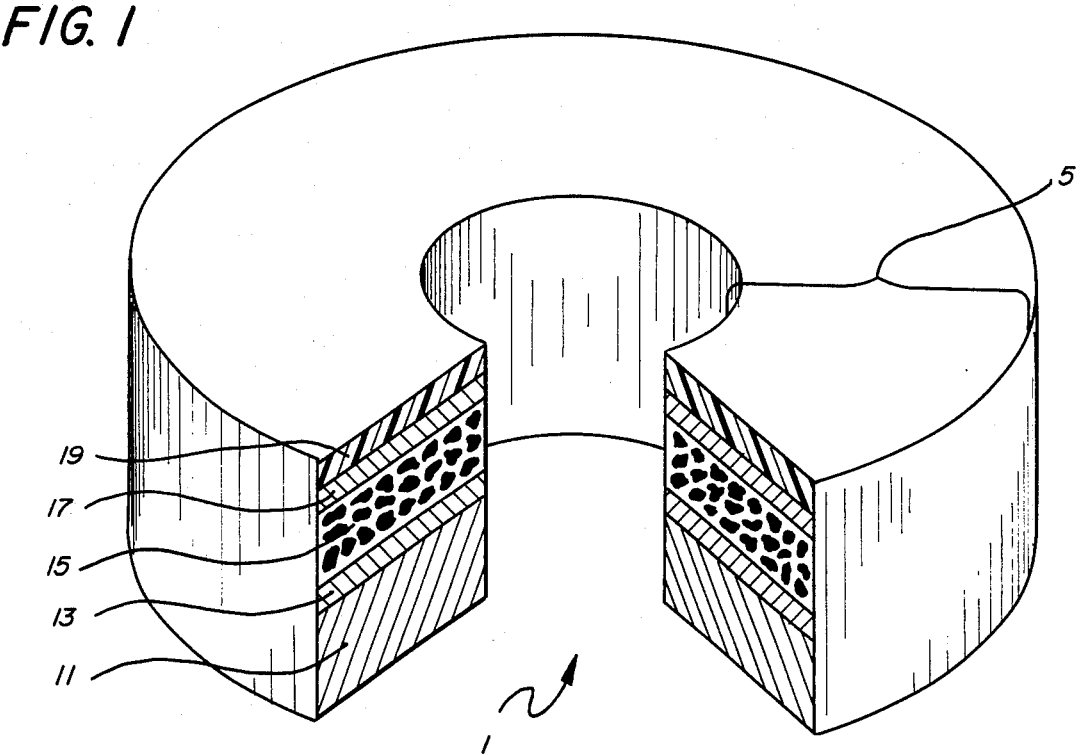
FIG. 1 is a partial cut-away isometric view, not to scale, with exaggerated latitudinal dimensions and vertical scale, of an optical data storage device.

FIG. 1 shows a typical projected beam data storage device 1 having a memory region 5. Within the memory region, shown in partial cut-away, is a substrate 11. Deposited on the substrate 11 is a thermal insulating layer 13. Atop the thermal insulating layer 13 is the memory layer 15. Above the memory layer 15 is an anti-ablation layer 17 and a protective layer 19. Most commonly, the protective layer will be a substantially transparent plastic layer.

A suitable alternative structure, not shown, has a laser incident transparent substrate, a barrier layer, the memory layer, a "remote" second barrier layer, and a protective layer, i.e., a second substrate. The barrier layers provide mechanical rigidity and support, oxidation protection, optical coupling, thermal isolation, and ablation inhibition.

The memory material is switchable between the detectable states, that is, switchable from one detectable state to a second detectable state. In a preferred exemplification, the material is reversibly switchable back to the first detectable state. The material is switchable, for example, by optical energy such as monochromatic light, or nonmonochromatic light. The memory material may also be switchable by particle beam energy.

The phase change material is a chalcogenide composition, for example, a chalcogenide composition containing a telluride. Most commonly, the chalcogenide composition contains tellurium and one or more cross linking agent(s). Cross linking agents can be elements of Groups IIIB, IVB, VB, and VIB of the Periodic Chart, including Al, In, and Ga from Group IIIB, Si, Ge, and Sn from Group IVB, N, P, As, Sb, and Bi from Group VB, S and Se from Group VIB, and mixtures thereof. Most commonly, the cross linking agent is Ge, either alone or with one or more of Si, Sn, As, or Sb. Additionally, the chalcogen composition may contain materials such as oxygen, sulfur, or mixtures thereof, as well as further cross linking agents such as tin, arsenic, or antimony, and additives such as gallium, or tin, and the like. In a preferred exemplification, the chalcogen is tellurium, the cross linking agent is germanium, either alone or with additional cross linking agents, e.g., tin, arsenic, and/or antimony, and the atomic ratio of cross-linking agent(s) to total tellurium and cross-linking agents is from about 1 percent to about 20 percent. Additionally, the memory material may further contain additives, such as tin, with a ratio of additive to chalcogen of from about 2 percent to about 10 percent.

Figure 2:
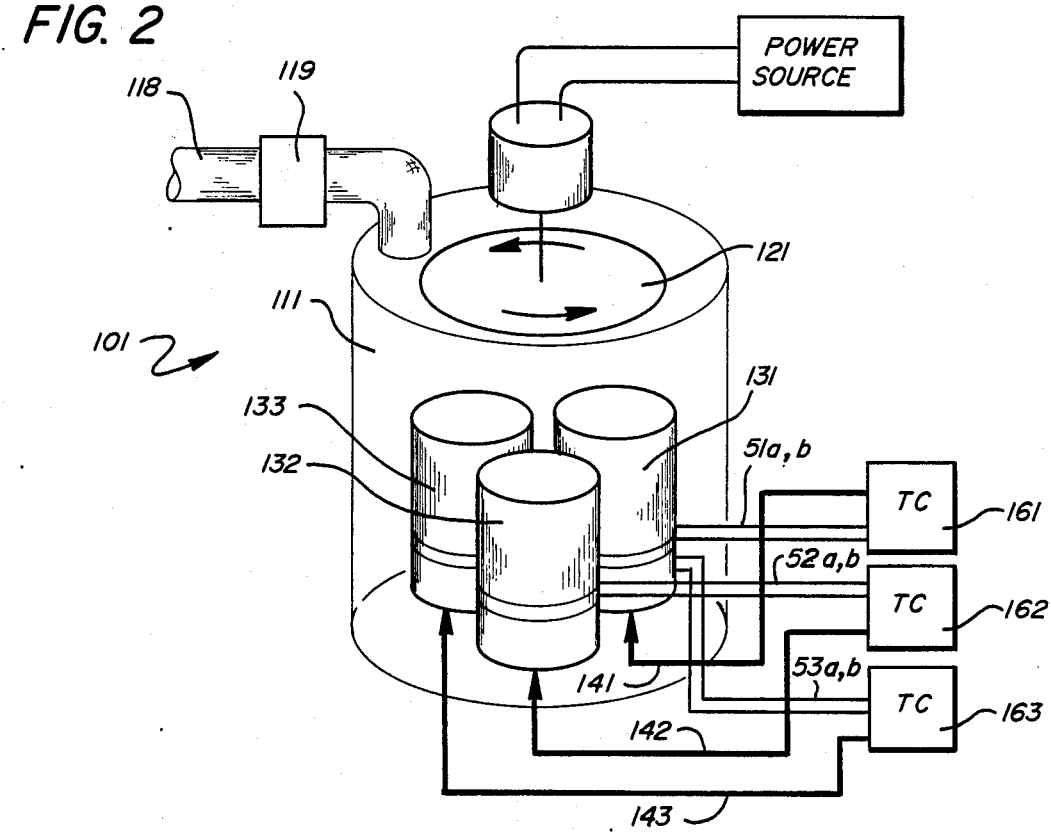
FIG. 2 is a schematic view of a vacuum deposition system useful in carrying out the method of the invention.

A vacuum desposition useful in the method of the invention is shown in FIG. 2. The system 101 includes a vacuum vessel 111. Within the vessel are three crucibles, furnaces, or "boats," e.g., substantially inert, ceramic crucibles 131, 132, and 133, heated by heating elements 141, 142, 143. The heating elements are individually controlled by controller and power supply 161, 162, 163. One vessel, 131, contains a substantially non-convecting, multi-component, solid, chalcogenide, first source. One vessel 132 may contain a chalcogen second source, e.g. tellurium. The third vessel 133 when present, may contain an oxygen containing source. The vessel 111 is pumped down by vacuum pump 119 through vacuum line 118.

In carrying out the method of the invention, all three sources, including the first source, i.e., the substantially non-convecting, multi-component, chalcogenide containing source, are converted to a non-condensed state, e.g., a gas, having substantial condensed state/non-condensed state equivalence. The source is substantially single phase, and may be a solid or a liquid. The source material is then deposited on a substrate as substrate 121 or a superjacent layer thereon to form a deposit having substantial non-condensed state/deposit equivalence, and the substantial absence of vertical concentration gradients. The source is congruently sublimating or congruently evaporating. That is, it has substantial condensed state/non-condensed state compositional equivalence.

In carrying out the method of the invention, the substrate 121 is rotated. The rotation is at high speed. This provides uniformity in the coating.

Most commonly, the first source contains cross linking agents, e.g., germanium, and or tin, optionally with lead and the chalcogen, e.g., tellurium. In order to attain congruent sublimation i.e., condensed state/non-condensed state compositional equivalence, the components are present as tellurides, e.g., germanium telluride and tin telluride. The telluride may be present as a mixed telluride $(Ge_xSn_{1-x})Te$ where x is from 0 to 1.0. The tellurium is about 50 atomic percent of the first source material whereby to provide solid/non-condensed state equivalence.

The second source may be, for example, tellurium or tellurium oxide, germanium, or germanium oxide.

When present to form an oxide-type layer, the oxygen containing third source, i.e., the material in crucible 133, may be a solid, as germanium oxide, tellurium oxide, tin oxide, and mixtures thereof. When the third source is germanium oxide, it may be an equimolar mixture of relatively low vapor pressure Ge and $GeO_2$ particles in a high state of subdivision, e.g., less than 0.02 mm. At temperatures of 600° C. to 800° C., this results in the formation of relatively high vapor pressure GeO. Alternatively, the oxygen containing source may be a gaseous source as $O_2$ or $NO_2$.

The layer of memory material 15 is formed by depositing the state change material according to the methods of the instant invention.

The reagents, e.g., the telluride, the tellurium, and, when present, the oxide, are converted to a non-condensed state by heating to evaporation, including sublimation. For example, in FIG. 2, resistance heaters 141, 142, 143 are shown to heat the individual crucibles 131, 132. 133.

The resulting deposit of phase changeable material is a thin film, e.g., on the order of 50 Angstroms to 2000 Angstroms thick.

While the invention has been described with respect to optical data storage materials, then method may also be used with switching materials, threshold switching materials, and memory materials.

We claim:

1. A method of depositing a multi-component, phase changeable, chalcogenide material onto a substrate, comprising the steps of:
   a. providing in a vacuum deposition means a substantially non-convecting, multi-component, congruently vaporizing chalcogenide first source;
   b. converting the first source to a non-condensed state having substantial source/non-condensed state compositional equivalence; and
   c. depositing material from the non-condensed state onto the substrate to form a deposit having substantial non-condensed state/deposit compositional equivalence and the substantial absence of concentration gradients.

2. The method of claim 1 wherein the first source is a solid source.

3. The method of claim 1 wherein the first source is a liquid source.

4. The method of claim 1 wherein the chalcogenide first source comprises tellurium.

5. The method of claim 1 comprising providing a chalcogen second source.

6. The method of claim 5 wherein the chalcogen second source comprises tellurium.

7. The method of claim 5 comprising providing an oxide third source.

8. The method of claim 7 wherein the oxide third source comprises tellurium oxide.

9. The method of claim 7 wherein the oxide third source comprises germanium oxide.

10. The method of claim 9 wherein the oxide third source comprises Ge and $GeO_2$.

11. The method of claim 1 wherein the congruently vaporizing chalcogenide first source comprises tellurium and a component chosen from the group consisting of germanium, tin, lead and mixtures thereof.

12. The method of claim 11 wherein the congruently vaporizing chalcogenide first source comprises germanium telluride and tin telluride.

13. The method of claim 12 wherein the congruently vaporizing chalcogenide first source comprises $(Ge_xSn_{1-x})$ Te where x is from 0.0 to 1.0.

14. An optical data storage device having a layer of a multicomponent, phase changeable, chalcogenide material on a substrate, said layer being deposited by the method comprising:
   a. providing in a vacuum deposition means a substantially non-convecting, multi-component, congruently vaporizing chalcogenide first source,
   b. converting the chalcogenide first source to a non-condensed state having substantial source/non-condensed state compositional equivalence; and
   c. depositing material from the non-condensed state onto the substrate to form a deposit having substantial non-condensed state/deposit compositional equivalence and the substantial absence of concentration gradients.

15. The optical data storage device of claim 14 wherein the congruently vaporizing chalcogenide first source comprises tellurium.

16. The optical data storage device of claim 14 wherein the congruently vaporizing chalcogenide first source comprises tellurium and a component chosen from the group consisting of germanium, tin, lead, and mixtures thereof.

17. The optical data storage device of claim 16 wherein the congruently vaporizing chalcogenide first source comprises germanium telluride and tin telluride.

18. The optical data storage device of claim 17 wherein the congruently vaporizing chalcogenide first source comprises $(Ge_xSn_{1-x})Te$ where x is from 0.0 to 1.0.

19. The optical data storage device of claim 14 comprising providing a chalcogen second source.

20. The optical data storage device of claim 19 wherein the chalcogen is tellurium.

21. The optical data storage device of claim 19 comprising providing an oxide containing third source in the vacuum deposition means.

22. The optical data storage device of claim 21 wherein the oxide containing third source comprises germanium oxide.

23. The optical data storage device of claim 14 wherein the layer of multicomponent, phase changeable, chalcognide material comprises tellurium, germanium, and tin.

24. The optical data storage device of claim 14 wherein the layer of multicomponent, phase changeable, chalcogenide material is a thin film.

25. The optical data storage device of claim 24 wherein the thin film layer of multicomponent, phase changeable, chalcogenide material is from about 50 to about 2,000 Angstroms thick.

* * * * *